United States Patent
Köpl et al.

(10) Patent No.: US 6,721,669 B2
(45) Date of Patent: Apr. 13, 2004

(54) METHOD AND DEVICE FOR MEASURING THE VOLUMETRIC FLOW OF A FLUID

(75) Inventors: Manfred Köpl, Bochum (DE); Alfons Harding, Borchen (DE)

(73) Assignee: Gilbarco Inc., Greensboro, NC (US)

( * ) Notice: Subject to any disclaimer, the term of this patent is extended or adjusted under 35 U.S.C. 154(b) by 0 days.

(21) Appl. No.: 10/245,555

(22) Filed: Sep. 17, 2002

(65) Prior Publication Data

US 2003/0018440 A1 Jan. 23, 2003

Related U.S. Application Data

(63) Continuation of application No. 10/077,353, filed on Feb. 15, 2002, now abandoned, which is a continuation of application No. 09/254,169, filed as application No. PCT/EP97/04602 on Aug. 23, 1997, now abandoned.

(30) Foreign Application Priority Data

Sep. 2, 1996 (DE) .......................... 196 35 435

(51) Int. Cl.$^7$ ................................ G01F 1/12
(52) U.S. Cl. ................ 702/55; 702/14; 702/100; 73/1.36
(58) Field of Search ............... 702/14, 35, 46, 702/49, 100; 73/861.77, 861.78, 261, 1.36

(56) References Cited

U.S. PATENT DOCUMENTS

| | | | |
|---|---|---|---|
| 3,199,727 A | 8/1965 | Romanowski | 222/20 |
| 4,306,457 A | 12/1981 | Fukui et al. | 73/861.77 |
| 4,581,946 A | 4/1986 | Kanayama | 73/861.77 |
| 4,885,943 A | 12/1989 | Tootell et al. | 73/861.77 |
| 4,969,365 A | 11/1990 | Strigard et al. | 73/861.77 |
| 5,016,187 A | 5/1991 | Forkert et al. | 364/510 |
| 5,447,062 A | 9/1995 | Kopl et al. | 73/261 |
| 5,574,229 A | 11/1996 | Castillo | 73/861.78 |
| 5,929,314 A * | 7/1999 | Bergkvist et al. | 73/1.36 |
| 6,089,102 A | 7/2000 | Bloss | 73/861.03 |
| 6,196,065 B1 | 3/2001 | Henksmeier et al. | 73/261 |
| 6,250,151 B1 | 6/2001 | Tingleff et al. | 73/261 |
| 6,279,386 B1 | 8/2001 | Nitecki et al. | 73/54.02 |
| 6,375,434 B1 | 4/2002 | Taivalkoski et al. | 417/261 |
| 6,397,686 B1 | 6/2002 | Taivalkoski et al. | 73/861.77 |

FOREIGN PATENT DOCUMENTS

| | | |
|---|---|---|
| DE | 41 42 062 A1 | 7/1993 |
| EP | 0 011 787 | 11/1979 |
| EP | 0 288 448 | 4/1988 |
| EP | 0 723 929 A1 | 1/1996 |
| WO | WO 93/12405 | 12/1992 |

\* cited by examiner

*Primary Examiner*—Kamini Shah
(74) *Attorney, Agent, or Firm*—Withrow & Terranova PLLC

(57) ABSTRACT

The present invention provides a flow meter whereby movement of fluid causes screw spindles or other movable elements to rotate and generate electronic pulses. The invention compensates for non-linearity in the relationship between the flow rate and the number of pulses, occurring particularly at low flow rates, by providing a device in the form of a transducer which assigns volume a value to each pules, which volume values are accumulated such that when certain predetermined value is exceeded a transducer generates a counter signal. Thus, the present invention enables compensation for non-linearity to be made and pulses output corresponding to a standard unit of volume.

27 Claims, 1 Drawing Sheet

METHOD AND DEVICE FOR MEASURING THE VOLUMETRIC FLOW OF A FLUID

This is a continuation of application Ser. No. 10/077,353, filed Feb. 15, 2002 now abandoned, which is a continuation of application 09/254,169 filed Jun. 2, 1999 (now abandoned), which is a 371 of PCT/EP97/04602 filed Aug. 23, 1997.

BACKGROUND OF THE INVENTION

The invention concerns a method and a device for the measurement of the volumetric flow of a fluid A method or device of this kind is known from WO 93/12 405, which describes a refueling system for motor vehicles where the volumetric measuring device consists of a screw spindle counter. The screw spindle counter consists of two intermeshing wormdrive screw spindles, one of which carries a magnet. Rotation of this magnet as a result of rotation of the screw spindle causes the generation of pulse-shaped measurement signals from a sensor element, which co-operates with the magnet, and which are fed to a measuring transducer which converts such measurement signals into counting signals for use by a counter stage. The pulse generator, integrated into the measuring transducer, contains a pulse alignment and pulse shaper stage which allows electronic adjustment of the pulses generated by the rotation of the screw spindles for calibration purposes before these are fed to the electronic counter with its arithmetic unit. In this way, pulses can be modified in amplitude and repetition frequency by external check and control pulses, which are derived from the arithmetic stage of the counter unit, so that they may, for example, be matched to an arithmetic relationship with the volume flow of the fuel uplifted. Within the arithmetic unit of the electronic counter, these check and control pulses may be adjusted by suitably authorized personnel to account for certain operational or climatic conditions or, when required, for calibration purposes.

Another type of electronic flow meter is disclosed in U.S. Pat. No. 4,885,943, employing a turbine, a detector for detecting the passage of turbine blades past the detector due o fluid flow within the turbine. The output from the detector, comprising a series of pulses, is processed to compensate for non-linearity in flow occurring at low flow rates, which is a similar problem to that which occurs with screw spindle meters of the type with which the present invention is concerned and which problem the present invention addresses.

In the case of a screw spindle counter, or a counter in which the displacer consists of paddle wheels, or in the case of counters having an oscillating piston as the movable element, then their construction often results in non-linearity between the test signal and the actual volume flow. For example, in the case of a low flow rate, the fluid quantity associated with one pulse may be greater or smaller than the flow rate associated with one pulse when the flow rate is higher.

SUMMARY OF THE INVENTION

The invention is based on the task to improve a generic device, respectively a generic process in respect of measurement accuracy.

The task is solved by the present invention.

According to the invention, signal correction takes place in the transducer, whereby the correction factor sued depends on the flow rate of the medium to be measured. For this purpose, the cycle frequency is determined, as a measure for the flow rate, of the movable element, respectively of the screw spindle. Relating to a plurality of cycle frequency values, corresponding correction factors are stored in a table or similar means within the transducer. Using the appropriate correction factor for the corresponding cycle frequency, the transducer derives counter signals and feeds these to the counter. Preferably, transducer signals are pulse-shaped, but they could also follow a sinusoidal law. Preferably, the cycle frequency is derived from the pulse duration or pulse chopping rate. In a preferred version of the invention, each pulse measured is weighted by the correction factor with a volume level. Volume levels are then dependent on the flow rate. For example, at a flow rate of 10 l/mm, the volume level may be 8 ml, whilst, for constructional reasons, at a flow rate of 1 l/mm, this increases to 11 ml. Such volume levels are summed up by the transducer which then generates a counter signal as soon as the sum total of all volume levels has reached a multiple of a standard volume level. If, in the case of the example mentioned, 10 ml were chosen as the standard volume level, and if refueling takes place at a flow rate of 1 l/min, then the transducer will generate a counter signal with the first measurement signal. If, on the other hand, refueling takes place at a flow rate of 10 l/min, then the transducer will not issue a counter signal after receiving the first measurement signal, since its memory store only holds a value of 8. Only after receipt of the second measurement pulse and when the memory contains a value which reaches or exceeds the standard volume level of 10 ml, a counter signal is generated. It is also conceivable that the value of the memory store is reached by the amount of the standard volume level after generating a counter signal so that counter signals are always issued when the memory store exceeds the level of the set standard. The memory store then only contains the remaining balance. Preferably, correction factors are stored in a table within the transducer for a multitude of cycle frequencies. In addition to the correction factors, a calibration factor may also be stored which, after signal linearisation to generate counter signals, is multiplied with the latter as in the state of the art by means of a proportionality factor so that he actual volume flow, dependent on operational and climatic conditions, may be shown on the display, and respectively may be added up by a counter. Correction factors between two levels contained in the table may be interpolated. Preferably, the transducer contains a microprocessor. Conversion of test signals into counter signals may then be micro-program controlled. A counter may add up the counter signals and the display may be either the sum total or the current flow rate.

BRIEF DESCRIPTION OF THE DRAWINGS

An example of a version of the invention is explained by means of the appended schematic representation.

DETAILED DESCRIPTION OF THE INVENTION

Figure 1:
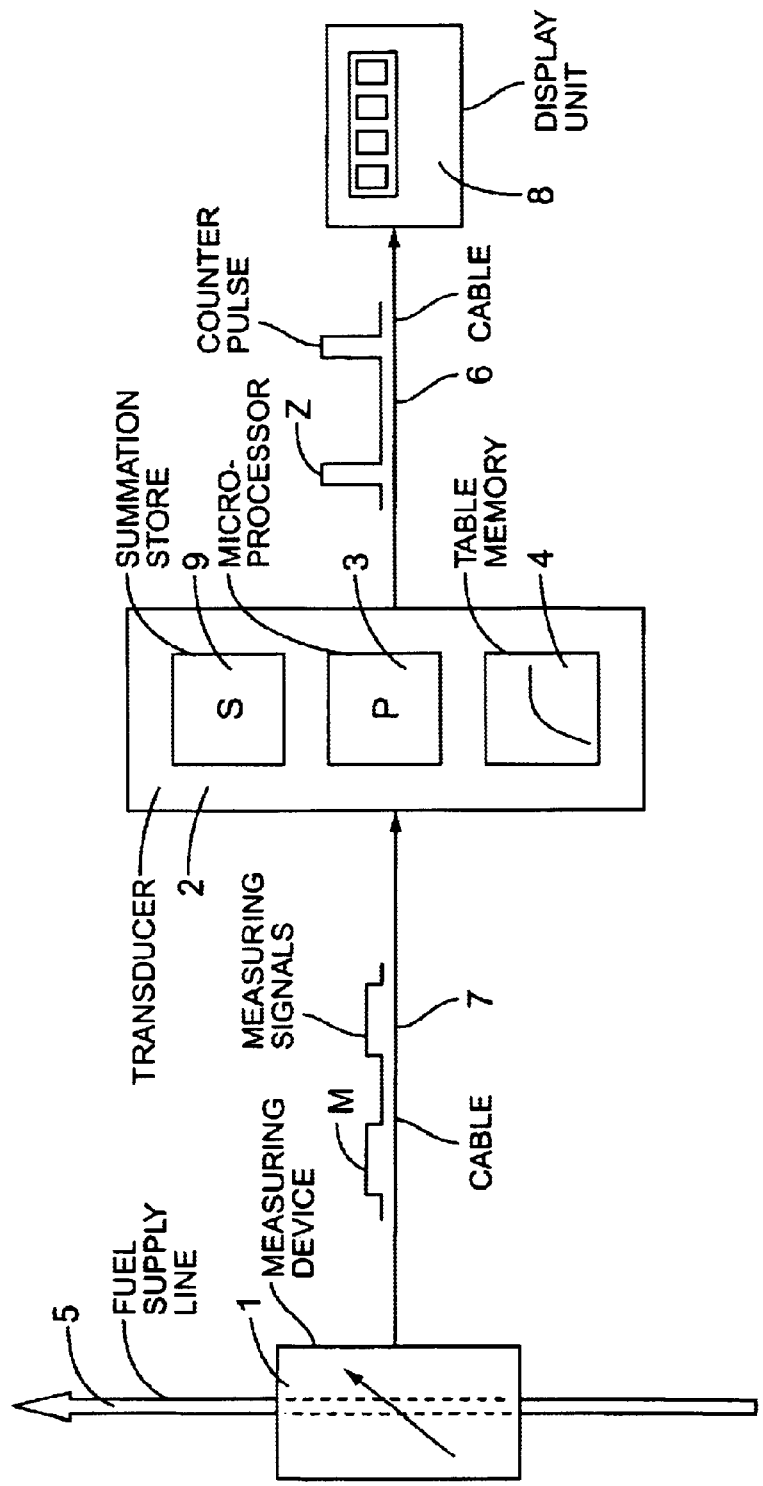

Reference number 5 identifies a fuel supply line within a fuel pump which originates from a fuel delivery pump and which leads to a fuel delivery nozzle. A volume measuring device is contained in supply line 5, consisting of a screw spindle counter, as described in WO 93/12 405. As explained therein, the screw spindle counter delivers measurement signals, in the form of pulses, identified by the letter M. Measurement signals M are fed by a connecting cable 7 to a transducer 2, containing a summation store 9 and a table memory 4. Correction factors are stored in table memory 4, which contains a multitude of correction factors relating to different pulse durations, respectively pulse repetition frequencies, of measurement signals M.

The microprocessor 3 analyses pulses M, coming from the measuring device 1 and fed by cable 7, in respect of their duration or repetition frequency and in this way determines the rotational frequency of the screw spindle. Based on such a rotational frequency, processor 3 calls a correction factor from table 4 and applies a weighted volume level to each pulse received, depending on its duration or repetition frequency, which corresponds to the actual volume level which has flown during the corresponding spindle rotation through the volumetric meter or which corresponds to a proportional value. For example, at a pulse duration of 10 ms, the corresponding measurement pulse is weighted with a volume level of 12 ml whilst a pulse of only 1 ms duration is weighted, for example, with a volume level of 8 ml. This would apply if at lower flow rates relatively more fuel passes through the measuring device 1 than at higher flow rates.

Volume levels determined for the individual pulses are added by a summation store 9. If the sum total reaches a multiple of the standard volume level, for example 10 ml, then transducer 2 will supply a counter pulse Z by cable 6 to the display-/arithmetic unit 8. Store 9 may either continue to total-up or its contents may be reduced by the amount of the standard volume level whenever a counter signal Z has been received. That way only the balance remaining from the last measurement value remains stored.

The device described, respectively the described process, is suitable for liquid as well as for gaseous media. Preferred applications are in fuel pumps for motor vehicles. The invention originates from the idea, that in case of measuring units of equal construction and depending on flow rate of the medium to be measured, identical errors occurs. It is the aim of the invention to compensate errors caused through constructional effects by integrated electronics. For preference the transducer is contained in the housing of the volume measuring device.

All features disclosed are material to the invention. Into the disclosure of the application the full disclosure contents of the corresponding priority documents and counter-part application are deemed to be inclined and incorporated by reference, including for the purposes to adopt features contained in such documents into the present application.

What is claimed:

1. A device for measuring volumetric flow of a fluid, comprising:
    a movable element arranged to move cyclically and having a cycle frequency, said element generating measurement signals; and
    a transducer for receiving the measurement signals, said transducer including:
        means for determining the cycle frequency from the measurement signals, means for modifying the measurement signals into weighted signals using a stored correction factor corresponding to the frequency, wherein each measurement signal is weighted by a volume value of the correction factor,
        means for totaling the weighted signals, and
        means for generating a counter signal when the total of the weighted signals has reached at least one of a standard volume level and a multiple of the standard volume level.
2. The device according to claim 1, wherein the movable element includes at least two screw spindles.
3. The device according to claim 1, wherein the measurement signals are pulse shaped and the cycle frequency is established by determining one of pulse duration and pulse repetition.
4. The device according the claim 1, wherein the transducer includes means for storing the correction factor in the form of a table having a plurality of values each corresponding to each of a plurality of cycle frequencies.
5. The device according to claim 4, further comprising means for interpolating a correction factor between two values.
6. The device according to claim 1, wherein the transducer includes a microprocessor.
7. The device according to claim 1, wherein the movable element includes one of a screw spindle counter, a gearwheel, and a volume displacing counter in a fuel pump.
8. The device according the claim 4, wherein the means for storing includes a table memory.
9. The device according to claim 1, wherein the means for totaling the weighted signals includes a summation store.
10. The device according to claim 1, further comprising a display unit for receiving the counter signal.
11. A method for measuring volumetric flow of a fluid, comprising;
    generating measurement signals with a movable element arranged to move cyclically and having a cycle frequency;
    outputting the measurement signals to a transducer;
    determining the cycle frequency of the measurement signals;
    modifying the measurement signals into weighted signals using a stored correction factor corresponding to the cycle frequency
    totaling the weighted signals;
    generating a counter-signal when the total of the weighted signals has reached al least one of a standard volume level and a multiple of the standard volume level; and
    communicating the counter-signal to an arithmetic unit for display.
12. The method according to claim 11, wherein the measurement signals are pulse shaped, and the step of determining the cycle frequency includes determining one of pulse duration and pulse repetition frequency of the measurement signals.
13. The method according to claim 11, further comprising storing a table of correction factors for a plurality of cycle frequencies in the transducers.
14. The method according to claim 13, further comprising interpolating the correction factor if the cycle frequency is between two of the plurality of cycle frequencies of the table.
15. The method according to claim 11, wherein the transducer includes a microprocessor.
16. The method according to claim 11, wherein the movable element is one of a screw spindle counter, a gearwheel counter, and a volume displacing counter in a fuel pump.
17. The method according to claim 11, further comprising the step of storing an overflow balance in the weighted signal exceeding the standard volume level.
18. The method according to claim 11, wherein said step of modifying the measurement signals into weighted signals comprises the step of multiplying the measurement signals by a stored correction factor corresponding to the cycle frequency.
19. A device for measuring volumetric flow of a fluid, comprising:

a movable element arranged to move cyclically and having a cycle frequency, said element generating measurement signals; and a transducer for receiving the measurements signals, said transducer adapted to:

determine the cycle frequency from the measurement signals;

modify the measurement signals into weighted signals using a stored correction factor corresponding to the cycle frequency, wherein each measurement signal is weighted by a volume value of the correction factor;

total up the weighted signals to create a total;

generate a counter signal when the total of the weighted signals has reached at least one of a standard volume level and a multiple of the standard volume level; and communicate the counter-signal to an arithmetic unit for display.

20. The device according to claim 19, wherein the movable element includes at least two screw spindles.

21. The device according to claim 19 wherein the measurement signals are pulse shaped and said transducer establishes the cycle frequency by determining one of pulse duration and pulse repetition.

22. The device according to claim 19, wherein said transducer further comprising a table of correction factors having a plurality of correction values each corresponding to each of a plurality of cycle frequencies.

23. The device according to claim 22, wherein said transducer interpolates an intetpolated correction factor from said table between two of said correction values.

24. The device according to claim 19, wherein said transducer includes a microprocessor.

25. The device according to claim 19, wherein said movable element includes one of a screw spindle counter, a gearwheel, and a volume displacing counter in a fuel pump.

26. The device according to claim 22, further comprising memory that stores said table of correction factors.

27. The device according to claim 19, further comprising a summation store to store the total of the weighted signals.

* * * * *